Aug. 4, 1936. W. CHAPMAN ET AL 2,049,556
COLOR PHOTOGRAPHY
Filed July 6, 1934 2 Sheets-Sheet 1
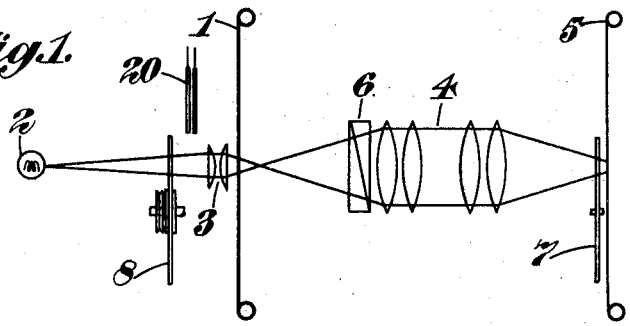
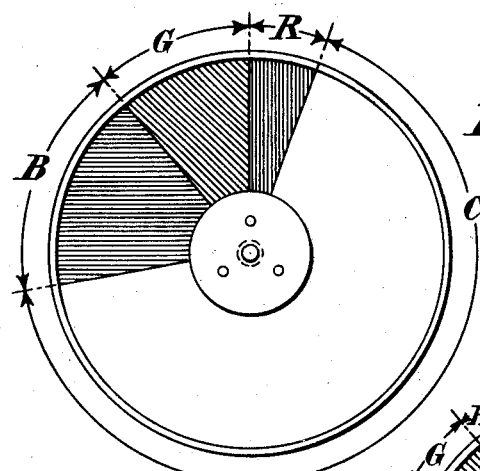
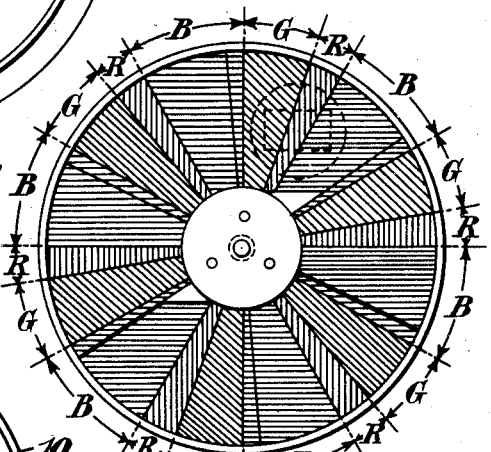
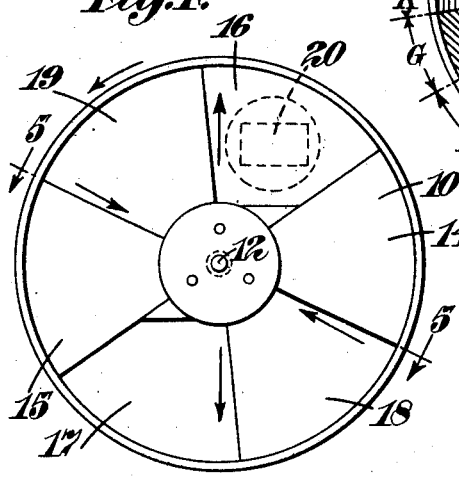
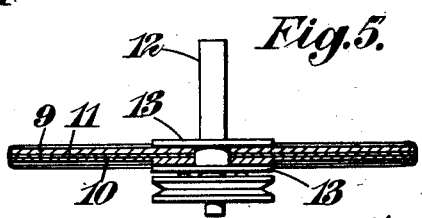

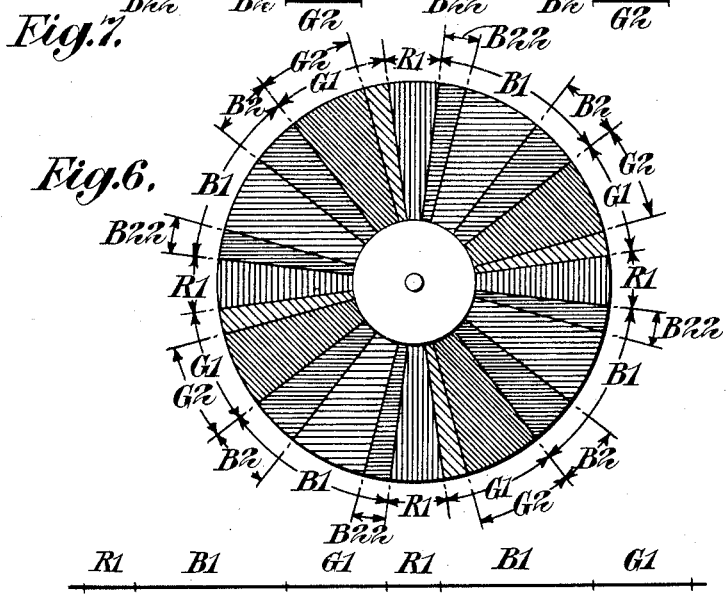
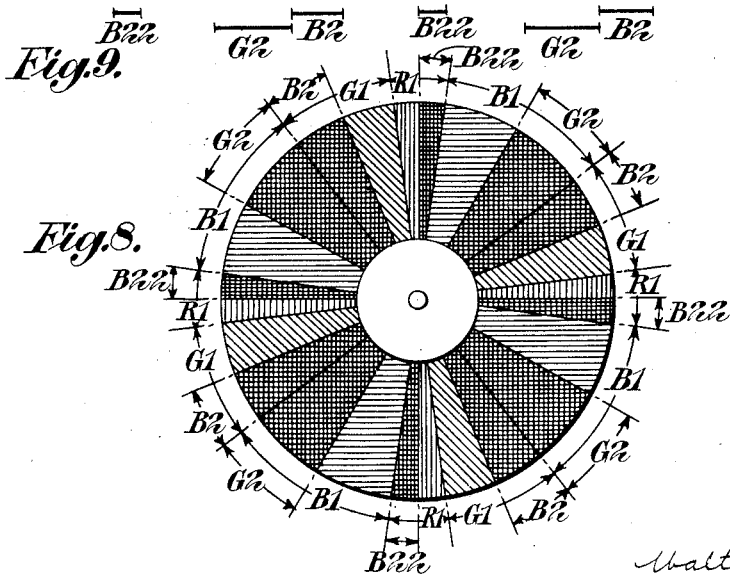

Patented Aug. 4, 1936

2,049,556

UNITED STATES PATENT OFFICE 2,049,556

COLOR PHOTOGRAPHY

Walter Chapman, Palmer's Green, London, and Thomas Thorne Baker, Hatch End, Middlesex, England, assignors to Dufaycolor Limited, London, England, a British company Application July 6, 1934, Serial No. 734,052
In Great Britain February 16, 1934

9 Claims. (Cl. 88—24)

This invention consists of improvements in or relating to color photography and is applicable to the reproduction, in natural colors, of transparencies from master transparencies of the type in which a multi-color screen is associated with the master emulsion.

A well-known difficulty that occurs in the printing of multi-color screen material on to multi-color screen material is the formation of dark and light bands on the copies: this effect being technically known as moire.

With the object of reducing moire the invention provides the method of printing a photographic copy on multi-color screen material from a multi-color screen master record which comprises passing in succession across the beam of light used for printing a series of light-deviating elements arranged to cause small successive deviations of the light beam.

The color elements of master transparencies of this type are often arranged in practice to transmit a proportion of light common to two or more of the primary colors of the screen. For example the red elements of a master transparency may transmit a proportion of light which is also transmitted by the green elements. In order, however, to reproduce satisfactorily the colors in a print on multi-color screen material produced from the master transparency it is important that the sensitive emulsion of the portions of the print which are to correspond respectively to each of the primary colors of the master screen should not record any of the light common to two or more of the primary colors of the master screen.

With this requirement in view and with the further object of improving the colors of the prints the invention also provides the method of printing a photographic copy on multi-color screen material from a multi-color screen master record in which the color transmission bands of the screen colors overlap which comprises passing in succession across the beam of light used for the printing a series of light deviating elements arranged to cause small successive deviations of the light in different directions and also eliminating from the printing light, light of color common to two or more colors of the master screen by passing in succession across the beam of light a series of color filters having color transmission bands corresponding respectively to the colors of the master screen but each having substantially no color transmission corresponding to the overlapping portions of the color transmission bands of the master screen colors. Preferably the color filters are carried on a disc rotated in the path of the light beam.

When black and white photographs are being printed it is customary to vary the exposure by controlling the intensity of an electric printing light by means of a rheostat inserted in the lighting circuit. It is found, however, that this method is unsuited for printing colored photographs of the kind to which this invention relates since the use of a rheostat varies the temperature of the light source and consequently the color of the light emitted. This difficulty is overcome according to a preferred feature of the present invention by providing means (e. g. a neutral grey screen) in the light beam for reducing, by absorption of a portion of the light, the intensity of the light reaching the copy, without altering the color of the light.

The invention includes apparatus for use in carrying out the method described above and comprising a disc rotatable in the path of the printing light and carrying a series of light deviating elements.

The invention will now be described, by way of example, with reference to the accompanying drawings in which:—

Figure 1 is a diagram showing the relative positions of various parts of the apparatus;

Figure 2 represents a combined filter disc and shutter;

Figure 3 represents a filter disc having a plurality of sets of filter elements;

Figure 4 is a view of the disc shown in Figure 3, with the colored sectors omitted for simplicity and showing diagrammatically the arrangement of the light deviating elements;

Figure 5 is a section along the line 5—5 of Figure 4;

Figure 6 represents the disc shown in Figure 3 with a second set of color filters arranged for adjustment to reduce the light intensity and shown in the position of maximum intensity;

Figure 7 is a diagram showing the relative positions of the two sets of color filters shown in Figure 6;

Figure 8 represents the two sets of color filters shown in Figure 6, but in the position of minimum light intensity, and Figure 9 is a diagram showing the relative positions of the two sets of filters as shown in Figure 8.

The invention is equally applicable to the printing of multi-color screen material either in contact with similar material or by projection on to multi-color screen material. The invention will, however, be described with reference to projection printing as shown in Figure 1. A master positive transparency is produced by exposing, developing and reversing a color screen film produced by the method described in United States specification No. 1,805,361, patented May 12, 1931. In order to obtain for this transparency a film having sufficient speed for the taking of moving pictures the color transmission bands of the elements of the screen are arranged to overlap slightly. Thus, in the present example the green elements transmit some light which is also transmitted by the blue elements and some which is also transmitted by the red elements. If, therefore, due to lack of registration during printing, a green element falls on a red or blue element of the copy screen light which is common to the two colors will affect the copy emulsion under the red or blue element and produce a false record.

It is important, therefore, in order to obtain true reproduction of the colors in the copy, to ensure that light which is transmitted by two or more colors of the master screen should not be contained in the printing light.

The light source 2 employed in this example is an ordinary half-watt printing lamp and the light is condensed by means of a lens system 3 on to the master film 1, and an image of the picture of this film is focussed by means of a lens system 4 on to the copy film 5. If desired an image duplicating or diffusing device 6 for instance a double refracting prism may be employed. A rotating shutter 7 having a sector of 240° opaque is used in the usual manner to cut off the light during movement of the film.

Inserted between the light 2 and the lens 3 is a color disc 8. This disc may be as shown in Figure 2 consisting of a sector C of 240° which may be left clear, in which case the disc is synchronized with the shutter 7 and so arranged that the portion C passes through the printing light at the same time as it is cut off by the shutter or it may be made opaque in which case the shutter may be dispensed with. The remaining portion of the disc is divided into three sectors R, G, B, each comprising a filter element of color corresponding to one of the colors of the screen elements of the master film but so sharply cut as not to transmit any light transmitted by any of the other colors of the screen. The angles of the sectors R, G, B, are so selected that a correct color balance is obtained in the copy and are arranged to compensate for any excess or deficiency of the several colors in the illumination, the over-all tints of the master and copy screens, the color sensitivity of the copy emulsion and the light transmissions of the filters themselves.

When it is preferred not to synchronize the disc with the shutter (for example, when it is desired to rotate the disc a considerable number of times for each exposure to obtain good mixing of the colors) the form of disc shown in Figure 3 is employed. In this form of the disc there are six equal sectors each divided into red, green and blue parts shown respectively as R, G, and B, and forming sharply cut filters as described above. It is found desirable to employ at least three, and preferably six, sectors since if the disc is not rotating in synchronism with the shutter there may for example, be a blue sector interposed in the light beam both at the beginning and the end of the exposure and consequently if this sector is of large angular width the exposure to blue may be excessive.

As shown in Figure 5, the disc is made up of a circular sheet of plain glass 9, a circular sheet of glass 10, and, between these, stained gelatin filter elements 11. The two discs are mounted on a spindle 12 and held in position by two metal discs 13. The sheet glass 10 is divided into six equal sectors as indicated in Figure 4. Two of these sectors 14, 15 are left parallel while the remaining are ground to form prisms. The sector 16 is ground to form a prism with its axis parallel to the arrow shown in the sector and having its thicker end at the periphery of the disc so that the light passing through the sector is deviated in the direction of the arrow. The angle of the prism is made very small and may be for example about 1½°. The sector 17 is ground in similar manner but in this case the angle is half that employed for sector 16. Sector 18 is ground with its axis parallel to the arrow in that sector, but with its thicker end at the center of the disc so that light passing through the center is deviated towards the center of the disc—the angle of this prism is similar to that for sector 16. Sector 19 is ground similar to sector 18, but in this case the angle is only half that employed in the case of sector 18. For convenience in the lay-out of the apparatus the picture frame 20, is arranged with its shorter sides parallel to but slightly offset from a vertical diameter of the disc as shown in Figures 3 and 4 and to compensate for this the several prisms are not ground with their axes bisecting the sectors, but as shown in the drawings—i. e. when the radius bisecting a sector passes through the center of the picture frame the axis of the prism is parallel to the shorter side of the frame.

The effect of the prisms is to cause variable deviations of the light beam and it will be seen that if the disc shown in Figures 3 to 5 be rotated in the anti-clockwise direction then in the position shown the light is deviated the maximum amount upwards and as the disc rotates the light is deviated to the left with increasing amount until the sector 14 comes in front of the beam when there will be no deviation. When the sector 18 starts to come into the beam the light will be deviated downwards and to the left and as rotation continues it will reach the maximum downward deviation and then deviate to the right and still downwards. Similar deviations will occur as the other sectors pass through the beam but the amounts of deviation will vary in accordance with the angles of the prisms.

In order to control the light intensity two neutral grey screens 20 may be inserted in the light beam either together or separately and these screens are given different opacities so that various intensities of light may be obtained by employment of one, or other, or both of the screens.

An alternative method of controlling the light intensity is shown in Figures 6–9 in which a series of secondary light filters $B_2$, $B_{22}$, and $G_2$ are placed in front of the main filters $B_1$, $R_1$, $G_1$. These secondary filters are of color corresponding to the main filters but need not be so sharply cut and consequently when they are in position over a filter of similar color as shown in Figures 6 and 7 they will cause very little extra absorption of light.

In this example the secondary filters are placed for minimum absorption and maximum light intensity as shown in Figures 6 and 7, i. e., one green $G_2$ with an angular width of 3 units on $G_1$ which has an angular width of 4 units and having one edge in juxtaposition with one edge of $B_1$. One blue $B_2$ on $B_1$ (which has an angular width of 6 units) with an edge adjacent to $G_1$ and having an angular width of 2 units and a second blue $B_{22}$ on $B_1$ with an edge adjacent to $R_1$ and having an angular width of 1 unit. There is no secondary light filter overlying the red $R_1$ (which has an angular width of 2 units). In now $G_2$ be caused to move by any desired mechanism over $B_1$, $B_2$ to move over $G_1$ and $B_{22}$ to move over $R_1$ with a ratio of angular movements of 6, 4 and 2 respectively then they will reach a position of maximum effect at the position shown in Figures 8 and 9, when $B_2$ covering half of $G_1$ will absorb the light transmitted by half of $G_1$, $G_2$ will stop half of the light transmitted by $B_1$ and since $B_{22}$ has an area of 1 unit and $R_1$ has an area of 2 units, one half of the light transmitted by $R_1$ will also be stopped.

In one specific case according to the invention which gave good results the light source employed was a half-watt projection type lamp having an emission approximately equivalent to red 150 green 110 and blue 30. The color transmissions of the master and copy screen elements as obtained from a spectograph wedge negative were blue 390–540$\mu\mu$ with a maximum at 455$\mu\mu$, green 455–615$\mu\mu$ with a maximum at 520$\mu\mu$ and red 565–710$\mu\mu$ with a maximum at 625$\mu\mu$ and the color transmissions of the color filters also as obtained from a spectograph wedge negative were chosen to be:—blue a maximum at 415$\mu\mu$ and no transmission above 455$\mu\mu$, green 535–565$\mu\mu$ with a maximum at 555$\mu\mu$ (a standard Wratten "Mercury green" filter) and red having no transmission below 630$\mu\mu$ and a maximum at 720$\mu\mu$. With these filters each 60° sector of the filter disc was divided into blue 34°, green 16° and red 10°. The color sensitivity of the copy emulsion as obtained from a spectogram using a half-watt light had the following values:—

| Wavelength | Density |
| --- | --- |
| 400 | 0 |
| 450 | 0.5 |
| 490 | 0.25 |
| 525 | 0.7 |
| 550 | 0.6 |
| 580 | 0.4 |
| 610 | 0.55 |
| 645 | 0 |

As described above the invention has been applied to the case where false reproduction of the colors is caused by over-lapping of the transmission bands of the master screen. False reproduction may also occur (even when the transmission bands of the master screen do not overlap) if the transmission bands of the master and copy screens have not the same values. Thus the transmission of the green of the master screen may extend over a portion of transmission of the blue of the copy and consequently a portion of the light passed by the master green will affect the emulsion behind the blue of the copy. Accordingly in a modified form of the invention the printing light used consists of a beam of light from which color common to a color of the master screen and a different color of the copy screen has been substantially eliminated by passing in succession across the beam of light a series of color filters having color transmission bands corresponding respectively to the colors of the screens but each having substantially no color transmission corresponding to the over-lapping portions of the color transmission bands of the master and copy screen colors of different color.

Although in the above examples the invention has been described with reference to a master positive it is of course equally applicable to the case in which the master is a negative.

We claim:—

1. Apparatus for use in printing a photographic copy on multi-color screen material from a multi-color screen master record, which comprises a light source, means for directing a beam of light emitted from the light source through the master record on to the copy material a disc-like element arranged for rotation in a plane transverse to the beam and to intercept the beam, means carried on the disc-like element for causing small successive deviations of the light beam in different amounts in different directions, and means located in the path of the beam of light for reducing, by absorption of a portion of the light, the intensity of the light reaching the copy without altering the color of the light.

2. Apparatus for use in printing a photographic copy on multi-color screen material from a multi-color screen master record, which comprises a light source, means for directing a beam of light emitted from the light source through the master record on to the copy material, a disc-like element arranged for rotation in a plane transverse to the beam and to intercept the beam, means carried on the disc-like element for causing small sucessive deviations of the light beam in different amounts in different directions, and arranged for insertion in the path of the light beam, at least two neutral grey screens having different opacities and arranged for use separately or in combination.

3. Apparatus for use in printing a photographic copy on multi-color screen material from a multi-color screen master record, which comprises a light source, means for directing a beam of light emitted from the light source through the master record on to the copy material and a disc arranged for rotation in a plane transverse to the beam and to intercept the beam and means carried on the disc for causing small successive deviations of the light beam in different amounts in different directions, the disc also carrying a plurality of color filters arranged around the disc and having color transmission bands corresponding respectively to the colors of the master screen but each having substantially no color transmission corresponding to the overlapping portions of the color transmission bands of the master screen colors and means for reducing the intensity of the light reaching the copy without substantially altering the color of the light comprising a second set of color filters rotatable in synchronism with, and having colors substantially corresponding to, the filters on the disc and arranged for angular adjustment in respect to the filters on the disc.

4. Apparatus for use in printing a photographic copy on multi-color screen material from a multi-color screen master record, which comprises a light source, means for directing a beam of light emitted from the light source through the master record on to the copy material and a disc arranged for rotation in a plane transverse to the beam and to intercept the beam and carrying a plurality of prisms arranged around the disc with their thicker ends alternately towards the center and towards the circumference of the disc.

5. Apparatus for use in printing a photographic copy on multi-color screen material from a multi-color screen master record, which comprises a light source, means for directing a beam of light emitted from the light source through the master record on to the copy material and a disc arranged for rotation in a plane transverse to the beam and to intercept the beam and carrying a plurality of prisms arranged around the disc with their thicker ends alternately towards the center and towards the circumference of the disc, the prisms being of different angles.

6. Apparatus for use in the printing of a photographic copy on multi-color screen material from a multi-color screen master record comprising a light source, means for directing a beam of light emitted from the light source through the master record on to the copy material and a disc arranged for rotation in a plane transverse to the beam and to intercept the beam, the disc comprising two glass plates having between them, as a sandwich, filter elements and one of the plates being ground to form a plurality of prisms arranged around the disc with their thicker ends alternately towards the center and towards the circumference of the disc.

7. Apparatus for use in printing a photographic copy on multi-color screen material from a multi-color screen master record comprising a light source, means for directing a beam of light emitted from the light source through the master record on to the copy material and a disc arranged for rotation in a plane transverse to the beam to intercept the beam and with its axis of rotation outside the beam, the disc comprising two glass plates having between them, as a sandwich, filter elements and one of the plates being ground to form a plurality of prisms arranged around the disc with their thicker ends alternately towards the center and towards the circumference of the disc.

8. Apparatus for use in the printing of a photographic copy on multi-color screen material from a multi-color screen master record comprising a light source, means for directing a beam of light emitted from the light source through the master record on to the copy material and a disc arranged for rotation in a plane transverse to the beam and to intercept the beam, the disc comprising two glass plates having between them, as a sandwich, filter elements and one of the plates being ground to form a plurality of prisms arranged at intervals around the disc with their thicker ends alternately towards the center and towards the circumference of the disc.

9. Apparatus for use in printing a photographic copy on multi-color screen material from a multi-color screen master record, which comprises a light source, means for directing a beam of light emitted from the light source through the master record on to the copy material and a disc-like element arranged for rotation in a plane transverse to the beam and to intercept the beam, means carried on the disc-like element for causing small successive deviations of the light beam in different amounts in different directions and, carried by the disc-like element, a plurality of color filters arranged around the element and having color transmission bands corresponding respectively to the colors of the master screen but each having substantially no color transmission corresponding to overlapping portions of the color transmission bands of the master screen colors.

WALTER CHAPMAN.
THOMAS THORNE BAKER.